H. ADERER.
PALATAL BAR.
APPLICATION FILED APR. 22, 1921.
1,392,612.  Patented Oct. 4, 1921.
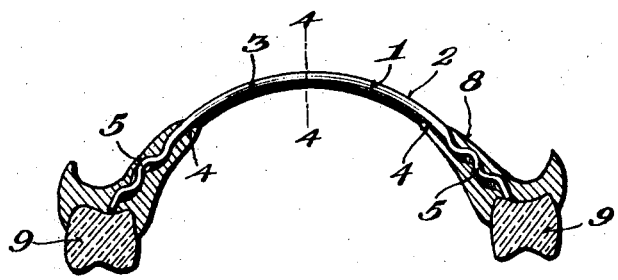
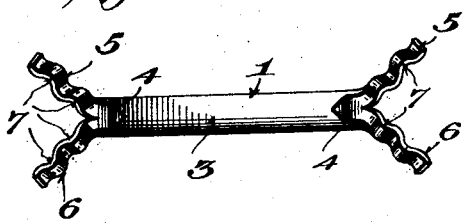
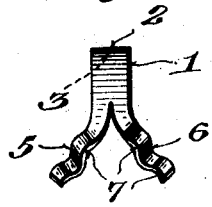
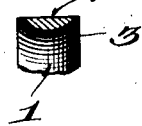
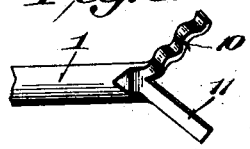
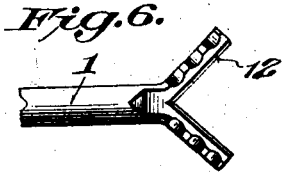
Inventor
Hugo Aderer,
By William L. Symons
Attorney

UNITED STATES PATENT OFFICE.

HUGO ADERER, OF EAST ORANGE, NEW JERSEY, ASSIGNOR TO J. F. JELENKO & CO., OF NEW YORK, N. Y., A FIRM COMPOSED OF JESSE F. JELENKO AND HUGO ADERER.

PALATAL BAR.

1,392,612.  Specification of Letters Patent.  Patented Oct. 4, 1921.

Application filed April 22, 1921. Serial No. 463,465.

*To all whom it may concern:*

Be it known that I, HUGO ADERER, a citizen of the United States of America, residing at 82 South Parkway, East Orange, in the county of Essex and State of New Jersey, have invented certain new and useful Improvements in Palatal Bars, of which the following is a specification.

This invention relates to palatal bars of the kind used in the dental art.

An object of my invention is the production of a bar of proper curvature to fit the jaw, and with the anchorage ends shaped to secure the maximum efficiency in holding the material in which the ends are embedded.

A further object of my invention is the production of a bar with anchorage ends consisting of spaced-apart prongs.

A further object of my invention is the production of a bar with prongs spread apart to secure the most efficient anchorage of the prongs in the rubber in which the prongs are usually placed.

A further object is to shape the prongs on the ends of the bar so that the bar will not be weakened and the prongs will still be efficient in holding in the rubber in which they are embedded.

These and other objects are attained by my invention, one embodiment of which is illustrated in the accompanying drawings, in which:

Figure 1 is a side elevation of my bar showing the ends of the bar embedded in a rubber plate having teeth attached thereto, the plate and teeth appearing in section.

Fig. 2 is a bottom plan view of the bar;

Fig. 3 is an end view;

Fig. 4 is a section on the line 4—4 of Fig. 1.

Fig. 5 is a modified form of end, and

Fig. 6 is another modification of the end.

This bar may be made of any suitable material, such as cased metal or solid gold. The body portion 1 may be of any suitable shape, such as round or elliptical, or it may be shaped as shown in the drawings, in which the upper part 2 is flat and the lower part 3 is curved. This body portion is curved generally to conform to the roof of the mouth.

The ends of the bar are duplicates and are made by flattening the ends, then slitting the flattened ends, and then spreading the ends apart on a curve to make the anchorage ends or prongs 5 and 6 which are corrugated or crimped as indicated at 7.

In Fig. 1, the bar is disclosed with the end incased in a plate 8, the plate being shown in section. One prong of each end is seen in this figure, the other prong being embedded in the plate. Artificial teeth 9 is shown in section are illustrated as they appear attached to the plate.

This bar may be used to fit any case with practically no adjusting. If necessary to make any changes, they may be readily made on account of the construction of the bar. The anchorage ends are strong and rigid and grip firmly in the rubber.

Instead of both prongs of each end of a bar being corrugated or crimped, one prong 10 may be corrugated and the other prong 11 may be flat, as shown in Fig. 5.

Or, as shown in Fig. 6, each prong 12 may be part corrugated and part flat. As illustrated, the corrugations extend inwardly from the edge of the prong, but do not extend the entire distance across the prong.

Having described my invention, what I claim is:

1. A palatal bar having integral ends, said ends comprising prongs, said prongs being curved outwardly from the plane of the bar, and said prongs having corrugations thereon.

2. A palatal bar consisting of a body part and ends, said ends being an integral part of said bar, each of said ends consisting of two prongs, and each of said prongs being curved outwardly from the plane of the bar and away from the adjacent prong.

3. A palatal bar, the ends thereof consisting of spread-apart prongs.

4. A palatal bar, the ends thereof consisting of duplicate spread-apart prongs, said prongs having corrugations thereon.

In testimony whereof I affix my signature.

HUGO ADERER.